US010747625B2

(12) United States Patent
Gaschler et al.

(10) Patent No.: US 10,747,625 B2
(45) Date of Patent: *Aug. 18, 2020

(54) METHOD FOR AUTOMATICALLY CONFIGURING BACKUP CLIENT SYSTEMS AND BACKUP SERVER SYSTEMS IN A BACKUP ENVIRONMENT

(71) Applicant: International Business Machines Corporation, Armonk, NY (US)

(72) Inventors: Andre Gaschler, Undenheim (DE); Nils Haustein, Soergenloch (DE); Dominic Mueller-Wicke, Weilburg (DE); Tim U. Scheideler, Schoenenberg ZH (CH); Joerg Walter, Undenheim (DE)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 15/854,987

(22) Filed: Dec. 27, 2017

(65) Prior Publication Data

US 2018/0121296 A1    May 3, 2018

Related U.S. Application Data

(63) Continuation of application No. 14/619,148, filed on Feb. 11, 2015, now Pat. No. 9,892,003.

(51) Int. Cl.
*G06F 16/27* (2019.01)
*G06F 16/84* (2019.01)
(Continued)

(52) U.S. Cl.
CPC ........ *G06F 11/1461* (2013.01); *G06F 16/122* (2019.01); *G06F 16/27* (2019.01);
(Continued)

(58) Field of Classification Search
CPC ............ G06F 11/1451; G06F 11/1461; G06F 16/113; G06F 16/178; G06F 16/116;
(Continued)

(56) References Cited

U.S. PATENT DOCUMENTS 7,092,977 B2    8/2006  Leung
7,840,595 B1    11/2010 Blitzer
(Continued)

FOREIGN PATENT DOCUMENTS

WO    2005036418 A1    4/2005
WO    2016128264 A1    8/2016

OTHER PUBLICATIONS

"System and method for smart cloud storage selection for backup and recovery", An IP.com Prior Art Database Technical Disclosure, Authors et. al.: Disclosed Anonymously, IP.com No. IPCOM000219432D, IP.com Electronic Publication: Jun. 29, 2012, pp. 1-6.

(Continued)

*Primary Examiner* — Dangelino N Gortayo
(74) *Attorney, Agent, or Firm* — David B. Woycechowsky (57) ABSTRACT

Automatically configuring backup client systems and backup server systems in a backup environment includes the following steps: determining if a new backup client system is available in the backup environment; in case of an available new backup client system a backup configuration module performs the sub-steps of: determining data types the new backup client system has to backup; determining corresponding backup policies for the determined data types based on a backup policy table mapping data types with backup policies; selecting a backup server system for the determined data types based on a backup server table including connection details of available backup server systems; configuring the determined backup policies for the (Continued)

data types of the new backup client system on the selected backup server systems; and updating the backup server table with an identifier of the new backup client system and an identifier of the backup policy.

19 Claims, 2 Drawing Sheets

(51) Int. Cl.
*G06F 16/11* (2019.01)
*G06F 16/178* (2019.01)
*G06F 11/14* (2006.01)

(52) U.S. Cl.
CPC .......... *G06F 16/86* (2019.01); *G06F 11/1448* (2013.01); *G06F 11/1451* (2013.01); *G06F 11/1456* (2013.01); *G06F 16/113* (2019.01); *G06F 16/178* (2019.01)

(58) Field of Classification Search
CPC ...... G06F 16/13; G06F 16/182; G06F 16/185; G06F 16/86
USPC ....... 707/654, 694, 640, 645, 646, 652, 653, 707/668
See application file for complete search history.

(56) References Cited

U.S. PATENT DOCUMENTS

| | | | |
|---|---|---|---|
| 7,966,513 B2 | 6/2011 | Desai | |
| 8,244,678 B1 | 8/2012 | Hartland | |
| 8,244,841 B2* | 8/2012 | Shaji | G06F 11/1415 707/666 |
| 8,285,850 B1* | 10/2012 | Jones | H04L 47/20 709/227 |
| 8,725,970 B2 | 5/2014 | Li | |
| 8,732,479 B1 | 5/2014 | Henriksen | |
| 8,756,201 B1 | 6/2014 | Dutch | |
| 8,935,212 B2 | 1/2015 | Titchener | |
| 9,015,120 B1 | 4/2015 | Dutch | |
| 9,575,843 B2 | 2/2017 | Brown | |
| 9,740,702 B2* | 8/2017 | Pawar | G06F 11/1484 |
| 2006/0218435 A1 | 9/2006 | Van Ingen | |
| 2007/0143851 A1* | 6/2007 | Nicodemus | H04L 63/1433 726/25 |
| 2007/0220319 A1* | 9/2007 | Desai | G06F 11/006 714/13 |
| 2012/0084261 A1 | 4/2012 | Parab | |
| 2012/0117029 A1 | 5/2012 | Gold | |
| 2013/0085995 A1 | 4/2013 | Mostachetti | |
| 2014/0006357 A1 | 1/2014 | Davis | |
| 2014/0289202 A1* | 9/2014 | Chan | G06F 9/54 707/652 |
| 2015/0254141 A1* | 9/2015 | Wertheimer | G06F 16/22 707/646 |
| 2016/0232061 A1 | 8/2016 | Gaschler | |

OTHER PUBLICATIONS

International Search Report and Written Opinion, International Application No. PCT/EP2016/052229, International Filing Date Feb. 3, 2016, 12 pages.
List of IBM Patents or Patent Applications Treated as Related, Filed Dec. 27, 2017, 2 pages.

* cited by examiner

METHOD FOR AUTOMATICALLY CONFIGURING BACKUP CLIENT SYSTEMS AND BACKUP SERVER SYSTEMS IN A BACKUP ENVIRONMENT

BACKGROUND OF THE INVENTION

The present invention relates in general to the field of backup environments, and in particular to a method for automatically configuring backup client systems and backup server systems in a backup environment, and a corresponding backup environment comprising at least one backup client system and at least one backup server system. Still more particularly, the present invention relates to a data processing program and a computer program product for automatically configuring backup client systems and backup server systems in a backup environment.

In a typical backup environment, backup clients back up data from respective backup client systems to one or more backup server systems. During the backup process, the data from the backup clients is copied to backup server systems. The backup server systems store the data in backup storages according to backup policies configured for the backup clients in the backup server systems. Backup policies depend on the type of the backup client. Backup clients each run on a server system. The server system, upon which the backup clients run, is called a "backup client system."

The type of backup client is given by the kind of data the backup clients back up. The type of backup client, or type of backup data, includes but is not limited to the following: operating system files; data base files and logs; emails from an email server; data from resource planning system; virtual machine environments; and/or files of any type. One backup client system can backup multiple types of data to one or more backup server systems. For example, a first backup client running on a first backup client system can back up data of a first data type to a first backup server system and data of a second data type to a second backup server system.

Backup policies that are configured at the backup server systems determine how the backup data is stored and managed over the lifecycle according to certain requirements. In a given backup environment there is typically a backup policy for each data type handled by a backup client. For example, the first data type is managed by the first backup policy, the second data type is managed by a second backup policy and a third data type is managed by a third backup policy, etc. Furthermore, there is typically one common backup policy for a given data type in environments where that given data type is backed up from multiple backup clients. For example, in some conventional backup environments, data of the first type is present on two backup client systems and is backed up to one backup server system managed by the first backup policy. In other conventional backup environments, the first backup client system backs up data of the first data type to the first backup server system managed by the first backup policy and the second backup client system backs up data of the first data type to the second backup server system.

One known challenge in a typical conventional backup environment is the proper configuration of the backup client systems based on their data types and backup policy in the backup server systems. The backup policy typically addresses and incorporates the requirements associated with the backup of data of a certain data type. Each backup policy is configured at the backup server system and requires knowledge and experience with the individual constructs that satisfy the backup policy for the backup client system and its data types. Once a backup policy is defined the backup client system must be associated with this backup policy in the backup server by assigning the server connection properties and credentials to the backup client system. This becomes even more complex if a backup client system hosts multiple data types which must be assigned to different backup policies in the backup server systems. All these configuration steps are performed manually.

SUMMARY

According to an aspect of the present invention, there is a method for configuring backup client systems and backup server systems in a backup environment. The method includes the following steps (not necessarily in the following order, and it is noted that steps may overlap in time): (i) determining whether a new backup client system is available in the backup environment; and (ii) responsive to a determination that a new backup client system is available, performing, by a backup configuration module, responsive actions including: (a) determining data types the new backup client system has to backup, (b) determining corresponding backup policies for the determined data types based on a backup policy table mapping data types with backup policies, (c) selecting a backup server system for the determined data types based on a backup server table including connection details of available backup server systems, (d) configuring the determined backup policies for the data types of the new backup client system on the selected backup server systems, and (e) updating the backup server table with an identifier of the new backup client system and an identifier of the backup policy.

According to a further aspect of the present invention, there is a backup configuration module for use in a backup environment including a set of backup client system(s) and set of backup server system(s). The backup configuration module includes: (i) a backup policy table, in the form of machine readable code, mapping data types with backup policies; (ii) a backup server table, in the form of machine readable code, including connection details of available backup server systems; (iii) a determination sub-module structured and/or programmed to determine whether a new backup client system is available in the backup environment; and (iv) a responsive actions sub-module structured and/or programmed to responsive to a determination that a new backup client system is available, performing the following responsive actions (not necessarily in the following order): (a) determining data types the new backup client system has to backup, (b) determining corresponding backup policies for the determined data types based on a backup policy table mapping data types with backup policies, (c) selecting a backup server system for the determined data types based on a backup server table including connection details of available backup server systems, (d) configuring the determined backup policies for the data types of the new backup client system on the selected backup server systems, and (e) updating the backup server table with an identifier of the new backup client system and an identifier of the backup policy.

According to a further aspect of the present invention, a computer program product stored on a computer-usable medium, includes computer-readable program means for causing a computer to perform a method for automatically configuring backup client systems and backup server systems in a backup environment, the method including the following steps (not necessarily in the following order and steps may overlap in time): (i) determining whether a new backup client system is available in the backup environment; and (ii) responsive to a determination that a new backup client system is available, performing, by a backup configuration module, responsive actions including: (a) determining data types the new backup client system has to backup, (b) determining corresponding backup policies for the determined data types based on a backup policy table mapping data types with backup policies, (c) selecting a backup server system for the determined data types based on a backup server table including connection details of available backup server systems, (d) configuring the determined backup policies for the data types of the new backup client system on the selected backup server systems, and (e) updating the backup server table with an identifier of the new backup client system and an identifier of the backup policy.

DETAILED DESCRIPTION

Some embodiments of the present invention recognize that conventional configuration for backing up data in conventional backup environment is: (i) time-consuming (because it is performed manually); (ii) error-prone (because it is performed manually); and/or (iii) difficult (because it can be complex).

Some embodiments of the present invention may include one, or more, of the following characteristics, features and/or advantages: (i) provide a method for automatically configuring backup client systems and backup server systems in a backup environment; (ii) provide a backup environment that is able to use an appropriate backup policy according to the data types the client needs to backup; and/or (iii) to provide a backup environment that is less time-consuming, less error-prone and/or less difficult to use.

In an embodiment of the present invention a method for automatically configuring backup client systems and backup server systems in a backup environment includes the step of (i) determining if a new backup client system is available in the backup environment; and (ii) in case of an available new backup client system a backup configuration module performs the sub-steps of: (a) determining data types the new backup client system has to backup, (b) determining corresponding backup policies for the determined data types based on a backup policy table mapping data types with backup policies, (c) selecting a backup server system for the determined data types based on a backup server table including connection details of available backup server systems, (d) configuring determined backup policies for the data types of the new backup client system on the selected backup server systems, and (e) updating the backup server table with an identifier of the new backup client system and an identifier of the backup policy.

In further embodiments of the present invention, the backup configuration module configures the new backup client system with connecting information of the selected backup server systems including at least one of the following information for each data type: connection details, options and/or credentials.

In further embodiments of the present invention, at least one of the following criteria of the backup server systems are used to select the backup server system: available backup policy, number of configured backup client systems below a certain first threshold, number of backup client systems using a corresponding backup policy above a certain second threshold, network connection information, available storage capacity in a corresponding backup storage matching a required storage capacity of the new backup client system, and/or data transfer rate.

In further embodiments of the present invention, the network connection information is denoted by at least one of the following criteria: (i) shortest distance of the backup server system relative to the new backup client system; and/or (ii) number and/or type of network interfaces between the backup server system and the new backup client system are sufficient to accommodate the backup of the data types.

In further embodiments of the present invention, the backup configuration module scans the backup environment to determine that the new backup client system is available. The backup configuration module may use name and TCPIP (Transmission Control Protocol/Internet Protocol) filters to scan the backup environment, for example.

In some embodiments, the new backup client system registers at the backup configuration module by sending an appropriate message to the backup configuration module.

In further embodiments of the present invention, the backup policy table comprises at least two columns, wherein: (i) a first column denotes data types and a second column denotes backup policies; and (ii) the second column comprises at least one sub-column denoted with one of the flowing requirements: (a) recovery point objective (RPO), (b) recovery time objective (RTO), (c) number of versions, (d) retention time, (e) backup window, (f) compression, and/or (g) policy name.

In further embodiments of the present invention, the backup configuration module tests the backup configuration by: (i) backing up data of each data type from the new backup client system; and (ii) determining if the data backed up is associated with an appropriate backup server system and backup policy.

In another embodiment of the present invention, a backup environment with at least one backup client system and at least one backup server system comprises a backup configuration module implemented with a backup policy table mapping data types with backup policies and a backup server table including connection details of available backup server systems. The backup configuration module is coupled to the at least one backup client system and the at least one backup server system and performs the above mentioned method for automatically configuring backup client systems and backup server systems in a backup environment according to the present invention.

In further embodiments of the present invention, the backup configuration module includes a client configuration module capable to communicate with the backup client systems.

In further embodiments of the present invention, the client configuration module is capable to configure a connection to corresponding backup server systems in a backup client of the backup client system.

In further embodiments of the present invention, the backup configuration module comprises a server configuration module capable to communicate with the backup server systems.

In further embodiments of the present invention, the server configuration module is capable to configure backup policies in the backup servers and to assign backup clients to the configured backup policies.

In another embodiment of the present invention, a data processing program for execution in a data processing system comprises software code portions for performing a method for automatically configuring backup client systems and backup server systems in a backup environment when the program is run on the data processing system.

In yet another embodiment of the present invention, a computer program product stored on a computer-usable medium, comprises computer-readable program means for causing a computer to perform a method for automatically configuring backup client systems and backup server systems in a backup environment when the program is run on the computer.

Some embodiments of the present invention allow automating the configuration of backup policies on backup server systems and the configuration of the backup client systems to use the appropriate backup policies according to the data types the backup client needs to backup.

Furthermore, some embodiments of the present invention provide a way to balance a plurality of backup client systems with different types of data on multiple backup server systems. It also allows simplified reporting by data type and/or by backup purpose (such as, daily backup for recovery or long term backup according to regulations, for example, because of standard configuration templates according to the data types).

In some embodiments, the usage of standard backup policies per data type simplifies the management of a backup solution.

Some embodiments of the present invention may include one, or more, of the following characteristics, features and/or advantages: (i) automatically detect new backup client systems; (ii) determine their data types; (iii) map the data types to backup policies; (iv) select the appropriate backup server system and/or; (v) configure the backup policies on the backup server systems and/or the backup client systems accordingly.

Some embodiments of the present invention implement a novel backup configuration module that is configured with a backup policy table including the mapping of the data types with backup policies and a backup server table including the connection details of the available backup server systems. For example, the backup configuration module determines that a new backup client system is available by scanning the network and optionally using name and TCPIP filters. Alternatively the backup client systems register with the backup configuration module by sending an appropriate message over the network to the backup configuration module. The determination of the data types the backup client systems wants to backup may be done by the backup client system itself. In this case the backup client system scans itself and informs the backup configuration module about the data types found during the scan. Alternatively, the backup configuration module scans the backup client system and determines the data types. For example, the scanning process executed by the backup client system or the backup configuration module determines applications installed and data stored on the backup client system in order to determine the data type of the corresponding backup client system.

Some embodiments of the present invention select the backup server systems based on selection criteria which may include one or more of the following: backup policies, number of clients, quality of network connections, distance between backup client system and backup server system, storage capacity, storage throughput, etc.

In some embodiments, backup policies that are configured at the backup server systems determine how the backup data is stored and managed over the lifecycle according to certain requirements. In some embodiments, a backup policy includes one, or more, of the following requirements: recovery time, recovery point, versioning, retention periods, backup window, space efficiency, and/or data volume. The recovery time defines duration of recovery process for a certain volume of data. The recovery point defines time period intervals for backup. Versioning defines how many versions to keep. The retention periods define how long to keep inactive versions of data. The backup window defines the maximum runtime of the backup for a certain volume of data. The space efficiency defines compression requirements for data. The data volume defines how much data is backed up every day in average.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
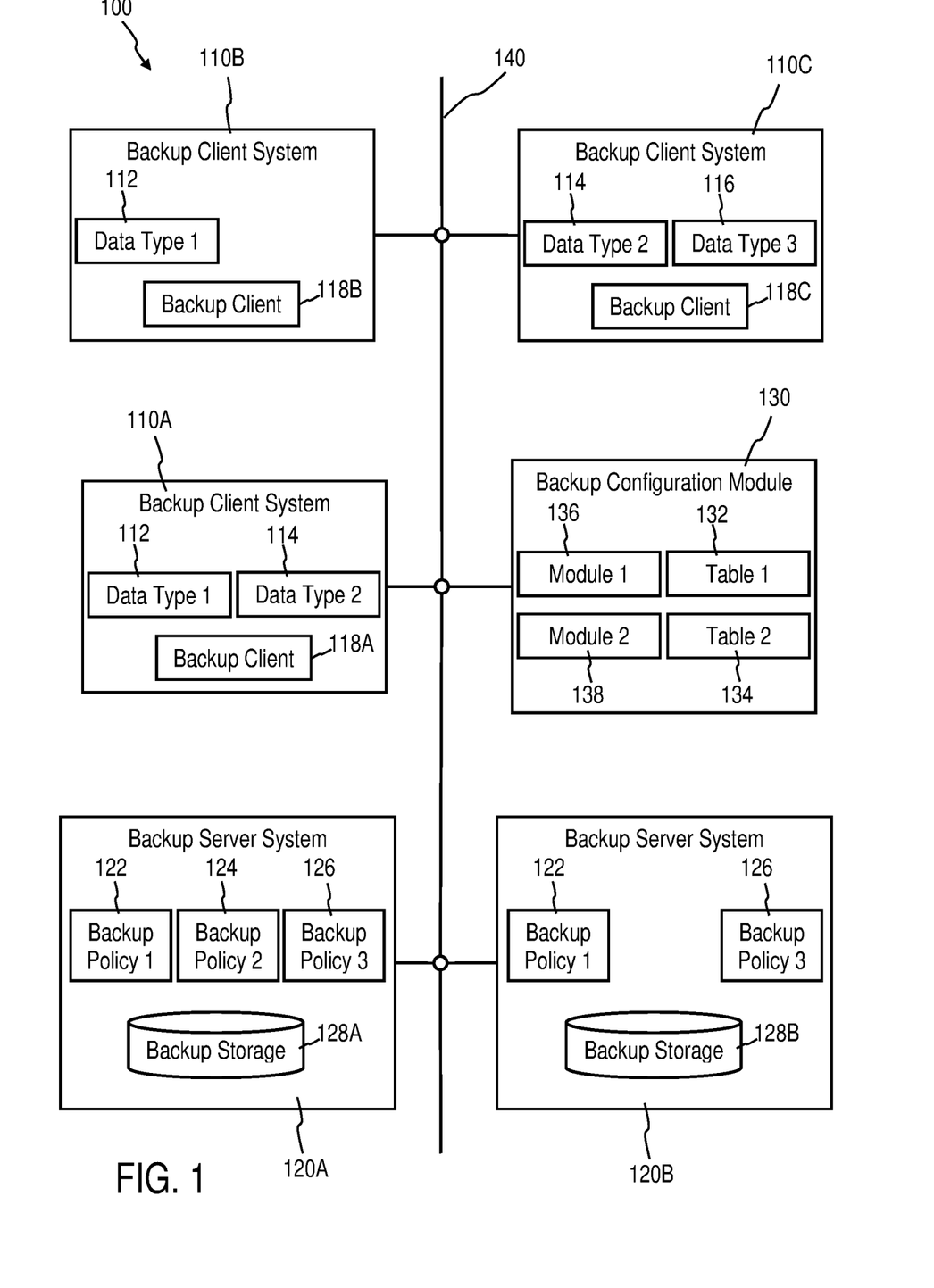
FIG. 1 is a schematic block diagram of a backup environment, in accordance with an embodiment of the present invention.

Referring to FIG. 1, the shown embodiment of the present invention employs a backup environment 100 comprising at least one backup client system 110A, 110B, 110C, at least one backup server system 120A, 120B and a backup configuration module 130 implemented with a backup policy table 132 mapping data types 112, 114, 116 with backup policies 122, 124, 126 and a backup server table 134 including connection details of available backup server systems 120A, 120B. The backup configuration module 130 is coupled to the at least one backup client system 110A, 110B, 110C and the at least one backup server system 120A, 120B via network 140.

In the shown embodiment the backup environment 100 comprises a first backup client system 110A with a first backup client 118A installed, hosting data of a first data type 112 and data of a second data type 114, a second backup client system 110B with a second backup client 118B installed, hosting data of the first data type 112, and a third backup client system 110C with a third backup client 118C installed, hosting data of the second data type 114 and data of a third data type 116. Further the backup environment 100 comprises a first backup server system 120A with a first backup storage 128A and a configured first backup policy 122, a configured second backup policy 124 and a configured third backup policy 126, and a second backup server system 120B with a second backup storage 128B and the configured first backup policy 122, and the configured third backup policy 126.

Still referring to FIG. 1, the backup configuration module 130 comprises the backup policy table 132 that maps the data types 112, 114, 116 to the according backup policies 122, 124, 126 in the backup server systems 120A, 120B. Furthermore the backup configuration module 130 comprises the backup server table 134 which includes the connection details for the backup server systems 120A, 120B and information about the configured backup policies 122, 124, 126 and the number of backup client systems 110A, 110B, 110C using these backup policies 122, 124, 126. In addition the backup configuration module 130 includes a client configuration module 136 that is capable to communicate with the backup client systems 110A, 110B, 110C and to configure the connection to the backup server system 120A, 120B in the respective backup client 118A, 118B, 118C. The backup configuration module 130 also includes a server configuration module 138 that is capable to communicate with the backup server systems 120A, 120B and to configure backup policies 122, 124, 126 and to assign backup client systems 110A, 110B, 110C to the configured backup policies 122, 124, 126.

The structure of the backup policy table 132 according to the backup configuration module 130 is shown below as Table 1 with some examples:

| Backup Policy | | | | | | |
|---|---|---|---|---|---|---|
| Data Type | RPO | RTO | Version | Retention | Window | Compression | Policy Name |
| 112 | 12 h | 24 h | 3 | 30 days | 4 h | no | 122 |
| 114 | 2 h | 12 h | 2 | 60 days | 2 h | yes | 124 |
| 116 | 24 h | 48 h | 1 | 10 days | 6 h | no | 126 |

Referring to row 3 of Table 1, the backup policy for data of the first data type 112 (row 3, column 1) are configured to achieve a recovery point objective (RPO) of 12 h (row 3, column 2). This can be achieved by backing up the data according to the first data type 112 every n hours, with n=12 hours.

The recovery time objective (RTO) (row 3, column 3) is 24 h, which means the data of the first data type 112 are stored on a backup server system 120A, 120B providing a backup storage 128A, 128B, which allows restoring data within 24 hours.

The number of versions (row 3, column 4) for this data type is 3, which means that 3 version of this data are kept. The retention time for expired versions (row 3, column 5) is 30 days. The backup window for the first data type 112 (row 3, column 6) is 4 hours, which means that a backup is completed in 4 hours. This essentially defines the throughput requirements for the backup storage 128A, 128B in the backup server systems 120A, 120B. The data of the first data type 112 are not compressed according to row 3 and column 7. The name of the first policy is 122 according to row 3 and column 8.

The structure of the backup server table 134 according to the backup configuration module 130 is shown below as Table 2 (which is broken into portion 1 (with columns 1 to 4), and portion 2 (with columns 5 to 10)) with some examples:

| Server (col. 1) | Connection (col. 2) | Backup policy (col. 3) | Number of clients (col. 4) |
|---|---|---|---|
| 120A | Server1.com:1500:credentials | 122 | 4 |
| 120A | Server1.com:1500:credentials | 124 | 1 |
| 120B | Server2.com:1501:credentials | 124 | 1 |
| 120B | Server2.com:1501:credentials | 126 | 3 |

| Subnet (col. 5) | Network Interfaces 1 Gbit/s (col. 6) | Network Interfaces 10 Gbit/s (col. 7) | Free Space in Storage Pool (col. 8) | IOPS (col. 9) | Restore Performance (col. 10) |
|---|---|---|---|---|---|
| 192.168.1.0/24 | 6 | 0 | 15 TB | 20K | 10 GB/h |
| 192.168.1.0/24 | 6 | 0 | 15 TB | 20K | 10 GB/h |
| 192.168.2.0/24 | 0 | 4 | 30 TB | 50K | 20 GB/h |
| 192.168.2.0/24 | 0 | 4 | 30 TB | 50K | 20 GB/h |

Referring to row 2 of Table 2, the first backup server system 120A (row 2, column 1) can be reached over the network 140 as server1.com on port 1500 with the credentials according to row 2, column 2. The first backup server system 120A has configured the first backup policy 122 according to row 2 and column 3. The number of backup client systems 110A, 110B, 110C associated with the first backup server system 120A and the first backup policy 122 is 4 according to row 2 and column 4. The first backup server system 120A is located in the subnet 192.168.1.0/24 (row 2, column 5) and has 6 network interfaces with the speed of 1 Gbit/s (row 2, column 6) but no 10 Gbit/s network interface (row 2, column 7). The first backup server system 120A has 15 TB available in the backup storage 128A according to row 2 and column 8. The first backup server system 120A handles 20.000 input/output operations per second (IOPS) according to row 2 and column 9. The first backup server system 120A can restore with 10 GB per hour according to row 2 and column 10.

The client configuration module 136 has knowledge about the backup volume and client network configuration. The RTO can be derived from the data type 112, 114, 116 of the backup client system 110A, 110B, 110C using the backup policy table 132 (Table 1, column 1 and 3). Based on the information provided in the backup server table 134 about the server network characteristics, the size of the available storage in the backup storage 128A, 128B, and the restore performance backup server system 120A, 120B, the backup server system for a new backup client, is selected as explained below in detail.

Figure 2:
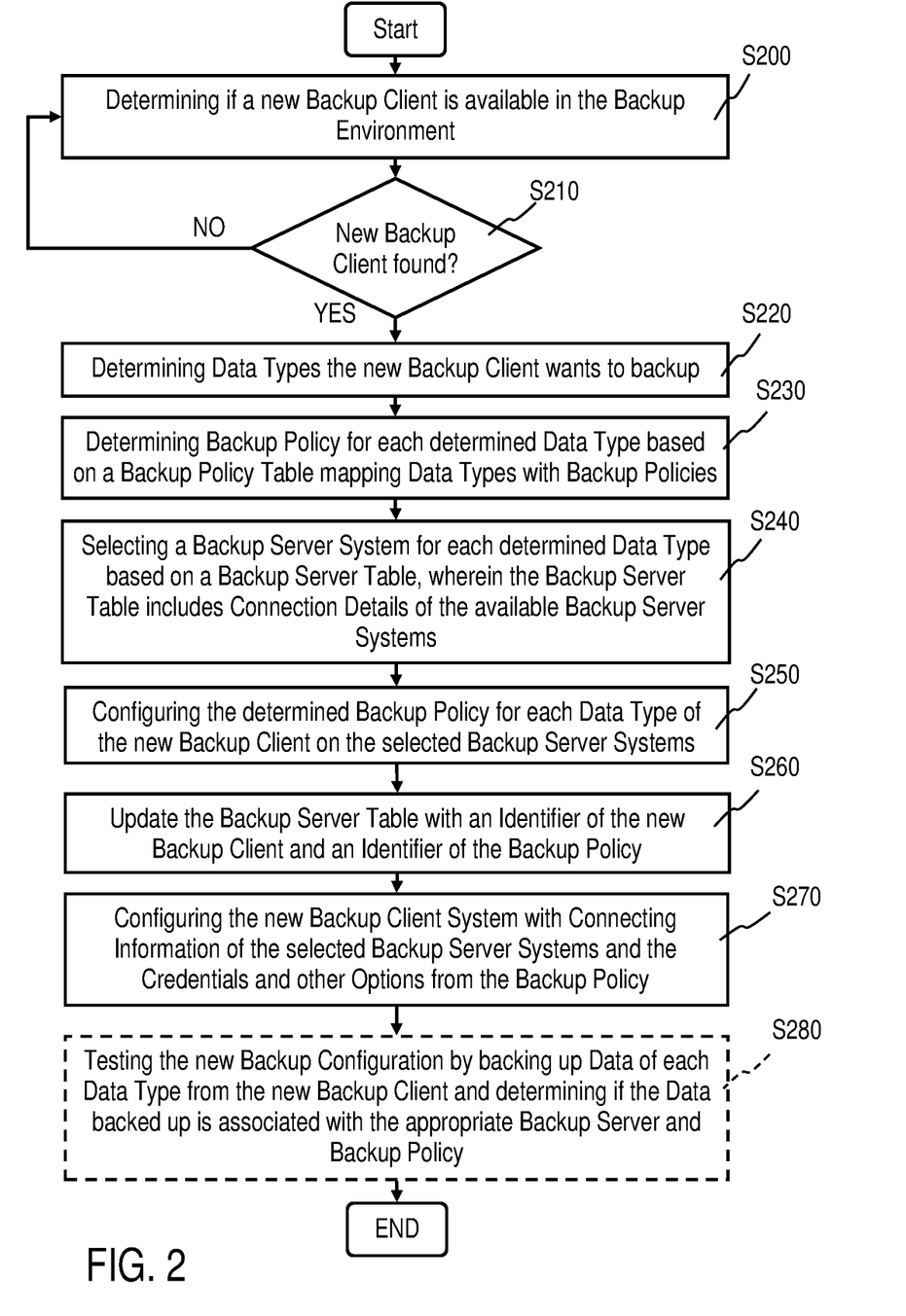
FIG. 2 is a schematic flow diagram of a method for automatically configuring backup client systems and backup server systems in a backup environment, in accordance with an embodiment of the present invention.

Referring to FIG. 2, the shown embodiment of the present invention employs a method for automatically configuring backup client systems and backup server systems in a backup environment. The backup configuration module 130 is configured for automatically configuring backup policies 122, 124, 126 in backup server systems 120A, 120B and assigning backup client systems 110A, 110B, 110C based on their data type 112, 114, 116. The process starts in step S200 where the backup configuration module 130 determines that a new backup client 118A, 118B, 118C running on a backup client system 110A, 110B, 110C is available using the client configuration module 136. This determination can be based on periodic network scans. These network scans can incorporate network filters to only scan relevant portions of the network 140. In an alternative embodiment a new backup client 118A, 118B, 118C sends a message by means of network messaging (e.g. broadcasting) to the backup configuration module 130. Responsive to this the backup configuration module 130 determines in step S210 that a new backup client 118A, 118B, 118C is present. In another embodiment the backup configuration module 130 scans the existing backup client systems 110A, 110B, 110C to detect systems which do not have yet a backup client 118A, 118B, 118C installed at all and installs the backup client 118A, 118B, 118C on such a backup client system 110A, 110B, 110C, unless the backup client system 110A, 110B, 110C is on an exclude list, for example, because it is a test server.

When a new backup client has been detected in steps S200 and S210 by the backup configuration module 130, the backup configuration module 130 determines the data types 112, 114, 116 hosted by the corresponding backup client system 110A, 110B, 110C in step S220. The determination of the data types 112, 114, 116 can be implemented by software and file system scans on the backup client systems 110A, 110B, 110C initiated and controlled by the backup configuration module 130. In an alternate embodiment the backup client systems 110A, 110B, 110C perform a scan for installed software and file systems and send this information to the backup configuration module 130 by means of network messaging.

In step S230 the backup configuration module 130 determines the backup policy 122, 124, 126 for each data type 112, 114, 116 by consulting the backup policy table 132 and matching columns 1 and 8. For example the first data type 112 (row 3, column 1) is mapped to the first backup policy 122 (row 3, column 8) according to the backup policy table 132.

In step S240 the backup configuration module 130 selects the backup server system 120A, 120B for each data type 112, 114, 116 by consulting the backup server table 134. In the shown embodiment the backup configuration module 130 selects one of the backup server systems 120A, 120B that has the configured backup policy 122, 124, 126 by matching column 3 of Table 2 with the backup policy 122, 124, 126 determined in the step S230. Further the backup configuration module 130 determines if the number of backup client systems 110A, 110B, 110C (column 4 of Table 2) using the backup policy 122, 124, 126 determined in step S230 in the selected backup server system 120A, 120B is below a certain first threshold.

If the number of backup client systems 110A, 110B, 110C is below the first threshold the backup configuration module 130 assigns the backup client system 110A, 110B, 110C to the backup policy 122, 124, 126 in the selected backup server system 120A, 120B using the server configuration module 138 and the server connection from backup server table 134 column 2. Assigning the backup client system 110A, 110B, 110C to the backup policy 122, 124, 126 in the backup server system 120A, 120B involves setting up credentials for this backup client system 110A, 110B, 110C.

If the number of backup client systems 110A, 110B, 110C is above the first threshold the backup configuration module 130 determines if there is another backup server system 120A, 120B available matching the backup policy 122, 124, 126 determined in step S230. If there is another backup server system 120A, 120B available the backup configuration module 130 proofs if the number of client systems 110A, 110B, 110C of this backup server system 120A, 120B is below the first threshold and so on.

If there is no other backup server system 120A, 120B available using the backup policy 122, 124, 126 determined in step S230 the backup configuration module 130 selects a new backup server system 120A, 120B.

In one embodiment of the present invention the backup server system 120A, 120B with the lowest number of configured backup client systems 110A, 110B, 110C according to backup server table 134 (Table 2, column 4), is selected as new backup server system, thus potentially the backup server system with the least workload is selected.

In another embodiment the backup server system 120A, 120B that provides the best network connection to the new backup client system 110A, 110B, 110C detected in steps S200 and S210 is selected as new backup server system using columns 6 and 7 of backup server table 134 (Table 2). The best network connection is denoted by the number of network interfaces the backup server system 120A, 120B has, the distance to the backup client system 110A, 110B, 110C and the type of network connection (1 Gbit, 10 Gbit).

In yet another embodiment the backup server system 120A, 120B with the largest free capacity in the backup storage 128A, 128B is selected as new backup server system using column 8 of backup server table 134 (Table 2).

In another embodiment the backup server system 120A, 120B that provides the backup storage 128A, 128B that can meet the required I/O operations per second is selected as new backup server system using column 9 of the backup server table 134 (Table 2). The required I/O operations per second can be derived from the required backup window in backup policy table 132, column 6.

In another embodiment the backup server system 120A, 120B is selected by comparing the backup size detected by the backup client 118A, 118B, 118C and the RTO given in the backup policy table 132 column 3 with the restore performance given in the backup server table 134 (Table 2, column 10).

In another embodiment some or even all criteria are used for selecting a backup server system 120A, 120B by assigning a score to each backup server system 120A, 120B. The backup server system 120A, 120B with the most points gets the backup client system 110A, 110B, 110C assigned to. If a predefined minimum score is not achieved by any of the backup server systems 120A, 120B a new backup server system 120A, 120B is selected.

In step S250 the backup configuration module 130 configures the backup policy 122, 124, 126 determined in step S230 according to the data type 112, 114, 116 determined in step S220 in the selected backup server system 120A, 120B, using the server configuration module 138 and the backup server system connection from backup server table 134 column 2. Further the new backup client system 110A, 110B, 110C determined in steps S200 and S210 is assigned to the configured backup policy 122, 124, 126, using the server configuration module 138 and the backup server system connection from backup server table 134 column 2. Assigning the backup client system 110A, 110B, 110C to the backup policy 122, 124, 126 in the backup server system 120A, 120B involves setting up credentials for this backup client system 110A, 110B, 110C.

In step S260 the backup configuration module 130 updates the backup server table 134 with the data type (column 1), backup policy (column 3) and number of clients (column 4) based on the client assignment.

Additionally, the backup configuration module 130 configures the new backup client system 110A, 110B, 110C in step S270 with connecting information of the selected backup server systems 120A, 120B and the credential and other options from the backup policy, for example compression in column 7 of Table 1, by using the server connection details from backup server table 134 (Table 2, column 2) and the client configuration module 136.

According to an optional step S280 the backup configuration module 130 tests the backup configuration of the new backup client system 110A, 110B, 110C by backing up data of each data type 112, 114, 116 from the new backup client system 110A, 110B, 110C and determining if the data backed up is associated with an appropriate backup server system 120A, 120B and backup policy 122, 124, 126.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) for use with a backup system that includes a set of backup client(s) coupled to a plurality of backup servers, the method comprising:
    configuring a backup configuration module with a backup policy table that includes: (i) a mapping of a plurality of data types to a plurality backup policies, and (ii) a backup server table including data indicative of connection details and availability of backup server of the plurality of backup servers, wherein the plurality of data types include the following data types: operating system files, data base files, database; emails; data from resource planning system(s) and virtual machine environments;
    coupling the backup configuration module to each backup client of the set of backup client(s);
    coupling the backup configuration module to each backup server of the plurality of backup servers;
    performing automated backup server configuration to configure each given backup server of the plurality of backup servers with backup policy(ies), from the backup server table, that respectively correspond to the data type of the of the plurality of data types of the data being backed up; and
    performing automated backup client configuration to configure each given backup client of the plurality of backup clients with connection details and availability of backup servers of the plurality of backup servers.

2. The CIM of claim 1 wherein the plurality of backup policies are policies specifying RPO (recovery point objective) values.

3. The CIM of claim 1 wherein the plurality of backup policies are policies specifying RTO (recovery time objective) values.

4. The CIM of claim 1 wherein the plurality of backup policies are policies specifying retention time values.

5. The CIM of claim 1 wherein the plurality of backup policies are policies specifying time window values.

6. A computer program product (CPP) for use with a backup system that includes a set of backup client(s) coupled to a plurality of backup servers, the CPP comprising:
    a machine readable storage device; and
    computer code stored on the machine readable storage device, with the computer code including instructions for causing a processor(s) set to perform operations including the following:
        configuring a backup configuration module with a backup policy table that includes: (i) a mapping of a plurality of data types to a plurality backup policies, and (ii) a backup server table including data indicative of connection details and availability of backup server of the plurality of backup servers, wherein the plurality of data types include the following data types: operating system files, data base files, database; emails; data from resource planning system(s) and virtual machine environments,
        coupling the backup configuration module to each backup client of the set of backup client(s),
        coupling the backup configuration module to each backup server of the plurality of backup servers,
        performing automated backup server configuration to configure each given backup server of the plurality of backup servers with backup policy(ies), from the backup server table, that respectively correspond to the data type of the of the plurality of data types of the data being backed, and performing automated backup client configuration to configure each given backup client of the plurality of backup clients with connection details and availability of backup servers of the plurality of backup servers.

7. The CPP of claim 6 wherein the plurality of backup policies are policies specifying compression type.

8. The CPP of claim 6 wherein the plurality of backup policies are policies specifying RPO (recovery point objective) values.

9. The CPP of claim 6 wherein the plurality of backup policies are policies specifying RTO (recovery time objective) values.

10. The CPP of claim 6 wherein the plurality of backup policies are policies specifying retention time values.

11. The CPP of claim 6 wherein the plurality of backup policies are policies specifying time window values.

12. The CPP of claim 6 wherein the plurality of backup policies are policies specifying compression type.

13. The CPP of claim 6 wherein the plurality of backup policies are policies specifying compression type.

14. A computer system (CS) for use with a backup system that includes a set of backup client(s) coupled to a plurality of backup servers, the CS comprising:

a processor(s) set;

a machine readable storage device; and computer code stored on the machine readable storage device, with the computer code including instructions for causing the processor(s) set to perform operations including the following:

configuring a backup configuration module with a backup policy table that includes: (i) a mapping of a plurality of data types to a plurality backup policies, and (ii) a backup server table including data indicative of connection details and availability of backup server of the plurality of backup servers, wherein the plurality of data types include the following data types: operating system files, data base files, database; emails; data from resource planning system(s) and virtual machine environments, coupling the backup configuration module to each backup client of the set of backup client(s), coupling the backup configuration module to each backup server of the plurality of backup servers, performing automated backup server configuration to configure each given backup server of the plurality of backup servers with backup policy(ies), from the backup server table, that respectively correspond to the data type of the of the plurality of data types of the data being backed up, and performing automated backup client configuration to configure each given backup client of the plurality of backup clients with connection details and availability of backup servers of the plurality of backup servers.

15. The CS of claim 14 wherein the plurality of backup policies are policies specifying RPO (recovery point objective) values.

16. The CS of claim 14 wherein the plurality of backup policies are policies specifying RTO (recovery time objective) values.

17. The CS of claim 14 wherein the plurality of backup policies are policies specifying retention time values.

18. The CS of claim 14 wherein the plurality of backup policies are policies specifying time window values.

19. The CS of claim 14 wherein the plurality of backup policies are policies specifying compression type.

* * * * *